(12) United States Patent
Cormier et al.

(10) Patent No.: US 10,220,736 B2
(45) Date of Patent: Mar. 5, 2019

(54) SEAT IMPACT ENERGY ABSORBING SYSTEM

(71) Applicant: VICONIC DEFENSE INC., Dearborn, MI (US)

(72) Inventors: Joel M. Cormier, Lathrup Village, MI (US); Richard F. Audi, Dearborn, MI (US); Donald S. Smith, Commerce, MI (US); Ryan J. Brooks, Allen Park, MI (US)

(73) Assignee: VICONIC DEFENSE INC., Dearborn, MI (US)

( * ) Notice: Subject to any disclaimer, the term of this patent is extended or adjusted under 35 U.S.C. 154(b) by 11 days.

(21) Appl. No.: 15/333,291

(22) Filed: Oct. 25, 2016

(65) Prior Publication Data

US 2018/0111518 A1   Apr. 26, 2018

(51) Int. Cl.
*B60N 2/24*   (2006.01)
*B60N 2/42*   (2006.01)
(Continued)

(52) U.S. Cl.
CPC .......... *B60N 2/4242* (2013.01); *B60N 2/24* (2013.01); *B60N 2/42709* (2013.01); *B60N 2/64* (2013.01); *F41H 7/046* (2013.01)

(58) Field of Classification Search
CPC ..... Y10T 428/24562; Y10T 428/24661; Y10T 428/24149; Y10T 428/24165; Y10T 428/234; Y10T 428/236; B32B 3/00; B32B 3/30; B32B 2307/558; B32B 2307/56; B32B 3/26; B32B 3/12; B32B 3/28; B60R 2021/0414; B60R 21/04; B60R 2021/0421; B60R 21/055; F16F 7/12; F16F 7/121; F41H 7/046; B60N 2/42; B60N 2/4242; B60N 2/4235; B60N 2/4214; B60N 2/4221; B60N 2/4228; B60N 2/64; B60N 2/646
(Continued)

(56) References Cited

U.S. PATENT DOCUMENTS 3,011,602 A   12/1961   Ensrud et al.
3,204,667 A   9/1965    Zahorski
(Continued)

FOREIGN PATENT DOCUMENTS

JP   136582      10/1975
JP   9150692 A   11/1995
(Continued)

OTHER PUBLICATIONS

International Search Report and Written Opinion; International application No. PCT/US2014/031333; dated Jul. 24, 2014.
(Continued)

*Primary Examiner* — Catherine A. Simone
(74) *Attorney, Agent, or Firm* — Brooks Kushman P.C.

(57) ABSTRACT

A seat impact energy absorbing system having an energy absorbing module that manages forces emanating from, for example, a land mine detonation. The module has frusto-conical structures joined by hollow interconnecting ribs that create support pillars there between. At least some of the support pillars have tops that underlie an occupant-supporting surface. To receive forces associated with detonation, an impact-receiving surface underlies the energy absorbing module.

10 Claims, 4 Drawing Sheets

(51) Int. Cl.
  B60N 2/64 (2006.01)
  F16H 7/04 (2006.01)
  B60N 2/427 (2006.01)
  F41H 7/04 (2006.01)

(58) Field of Classification Search
  USPC .............. 428/166, 178; 296/65.02, 187.02, 296/187.03, 187.05
  See application file for complete search history.

(56) References Cited

U.S. PATENT DOCUMENTS

| | | | |
|---|---|---|---|
| 3,231,454 A | 1/1966 | Williams | |
| 3,876,492 A | 4/1975 | Schott | |
| 4,530,197 A | 7/1985 | Rainville | |
| 4,755,416 A | 7/1988 | Schneider et al. | |
| 4,890,877 A | 1/1990 | Ashtiani-Zarandi et al. | |
| 5,030,501 A | 7/1991 | Colvin et al. | |
| 5,383,314 A | 1/1995 | Rothberg | |
| 5,390,467 A | 2/1995 | Shuert | |
| 5,399,406 A | 3/1995 | Matsuo et al. | |
| 5,518,802 A * | 5/1996 | Colvin | B32B 3/12 428/166 |
| 5,551,673 A * | 9/1996 | Furusawa | B60R 19/02 267/160 |
| 6,715,592 B2 | 4/2004 | Suzuki et al. | |
| 6,777,062 B2 * | 8/2004 | Skaja | B32B 3/26 428/143 |
| 6,938,290 B2 | 9/2005 | McKinney et al. | |
| 7,033,666 B2 | 4/2006 | Skaja | |
| 7,249,662 B2 | 7/2007 | Itou | |
| 7,416,775 B2 | 8/2008 | Snel | |
| 7,574,760 B2 | 8/2009 | Foley et al. | |
| 7,866,248 B2 | 1/2011 | Moore, III et al. | |
| 8,915,339 B2 | 12/2014 | Kanous et al. | |
| 9,194,136 B2 | 11/2015 | Cormier et al. | |
| 9,279,258 B2 | 3/2016 | Cormier et al. | |
| 2005/0133324 A1 | 6/2005 | Soto Bailon et al. | |
| 2005/0200062 A1 | 9/2005 | Maurer et al. | |
| 2005/0281987 A1 | 12/2005 | Starke | |
| 2011/0135852 A1 | 6/2011 | Sawyer | |
| 2014/0007761 A1 | 1/2014 | Haidar | |

FOREIGN PATENT DOCUMENTS

| | | |
|---|---|---|
| JP | 08085404 | 4/1996 |
| JP | 11348699 A | 12/1999 |
| WO | 9300845 A1 | 1/1993 |
| WO | 9711825 A3 | 4/1997 |
| WO | 0031434 | 6/2000 |

OTHER PUBLICATIONS

International Search Report and Written Opinion; International application No. PCT/US2015/016103; dated May 15, 2015.

International Preliminary Report on Patentability; corresponding International application No. PCT/US2014/031333; date of issuance of report dated Oct. 20, 2015.

* cited by examiner

SEAT IMPACT ENERGY ABSORBING SYSTEM

CROSS REFERENCE TO RELATED APPLICATIONS

This application is related to U.S. Pat. No. 9,194,136 issued Nov. 24, 2015 and U.S. Pat. No. 9,279,258 issued Mar. 8, 2016.

TECHNICAL FIELD

Several embodiments of this disclosure relate to an apparatus and method for absorbing energy delivered to a seat occupant through a vehicle seat by, for example, a detonated land mine.

BACKGROUND

The safety of occupants in military vehicles during land mine detonation is an ongoing concern. One way to reduce spinal fracture and thus to improve survivability is to limit the forces transmitted through a seat to its occupant.

Conventionally, this has been accomplished by deploying thick, soft cushions. But the low spring rates of soft cushions permit high speeds to be reached between the occupant and a seat pan in response to a blast. This phenomenon tends to increase the lumbar/pelvic load imposed on the seat occupant. The total thickness of the compressed cushion is ideally minimized. Therefore, careful deployment of other mechanical energy absorbing components is desirable in a crashworthy energy-absorbing seat design.

To reduce the impact between the seat pan and occupant in response to high blast forces, the seat structure must possess sufficient energy absorption capacity before the structure bottoms out.

Ideally, a desirable energy absorber should be light in weight, not take up excessive space and yet still exhibit high specific energy absorption. Preferably, the absorber should respond to an impact with a relatively constant force, resist loads in the opposite direction due to the stroking (rebound), and be relatively insensitive to the rate at which a blow is delivered.

But conventional military and industrial vehicle seat systems may not adequately respond to blast forces transmitted by land mines and other improvised explosive devices. Innovations in vehicle armor alone tend to be insufficient to mitigate blast forces and reduce the incidence of injury to the occupants of, for example, military vehicles that operate in a war zone.

Thus, there is an unfulfilled need for energy absorbing and dissipating structures for effectively resisting blast impulses.

Against this background, it would be desirable to provide an energy-absorbing apparatus and method that:

Has a minimal installed cost;
Is compatible with existing vehicle seats;
Enhances (or does not diminish) the overall appearance of the seat;
Meets all military and vehicle codes and requirements;
Provides additional protection to the seat occupant; and
Requires little or no maintenance.

Among the art considered before filing this application are the following references: "Lumbar load attenuation for rotorcraft occupants using a design methodology for the seat impact energy-absorbing system", Central European Journal of Engineering, 2012, 562-577; U.S. patent publication No. 2014/0007761; U.S. Pat. Nos. 5,030,501; 6,938,290; 7,574,760; 8,915,339; and 9,279,258.

DETAILED DESCRIPTION

One aspect of this disclosure involves a seat impact energy absorbing system 10, as depicted in FIGS. 1-4. The system 10 may have one monolithic energy absorbing module 12 alone (FIG. 2), or may have interconnected, preferably thermoplastic, energy absorbing modules 12 that cooperate to manage energy delivered by a detonated land mine, for example. Each module 12 has the ability to absorb and redirect at least some of blast forces that are delivered to a seat occupant; a feature sometimes termed "blast mitigation". In response to the blast, the module 12 may or may not recoil or rebound to or towards an undeflected position.

Figure 1:
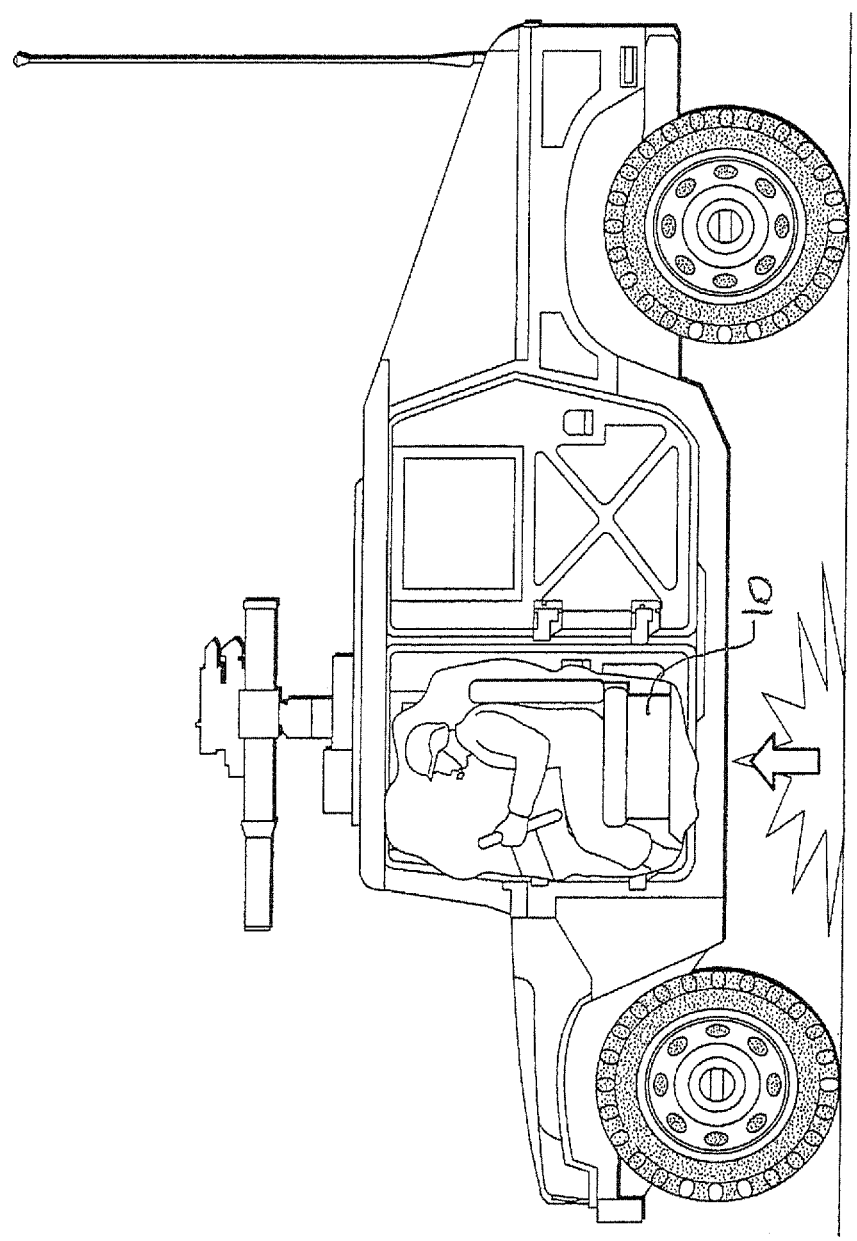
FIG. 1 is an environmental side view of a seat impact energy absorbing system deployed on a military vehicle.
Figure 2:
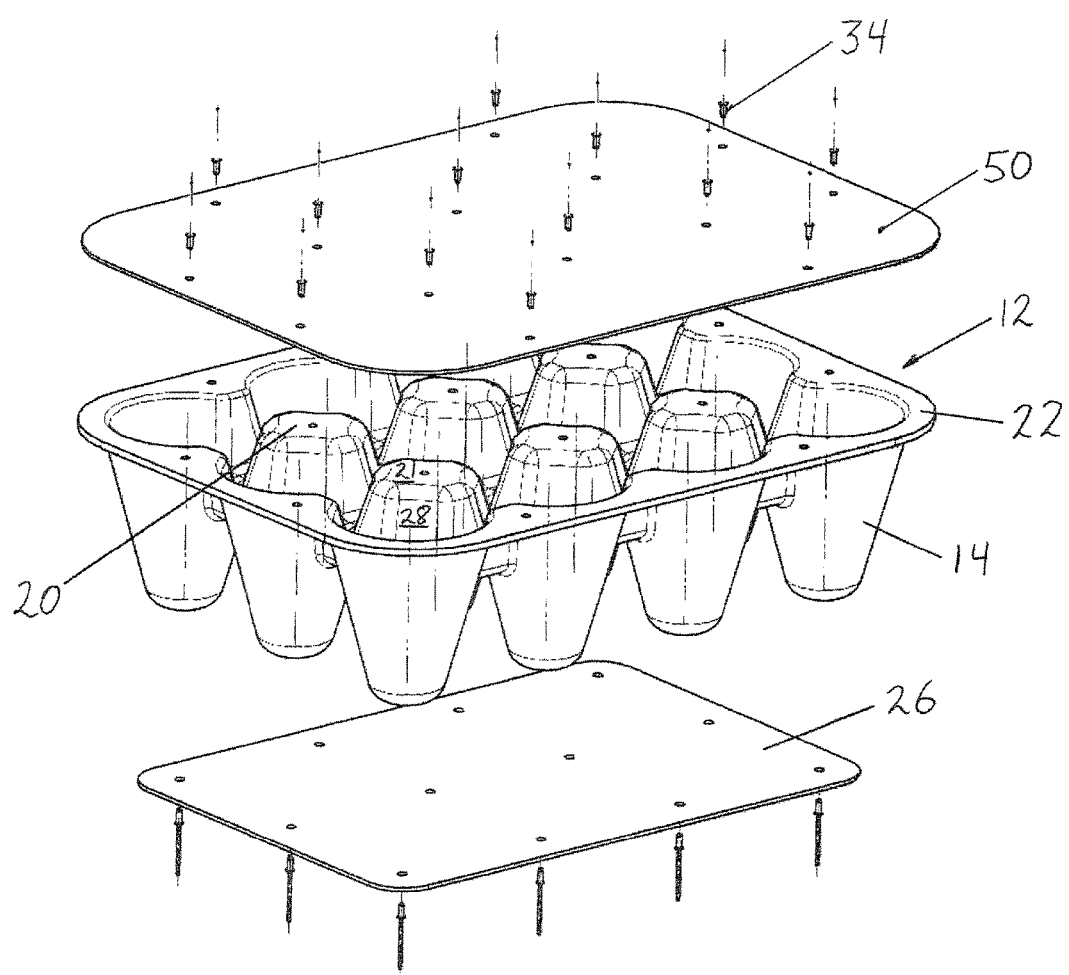
FIG. 2 is an exploded view of the energy absorbing system appearing in FIG. 1, with an occupant-supporting load supporting surface that is attached above and an impact-receiving surface that is attached below the energy absorbing system.
Figure 3:
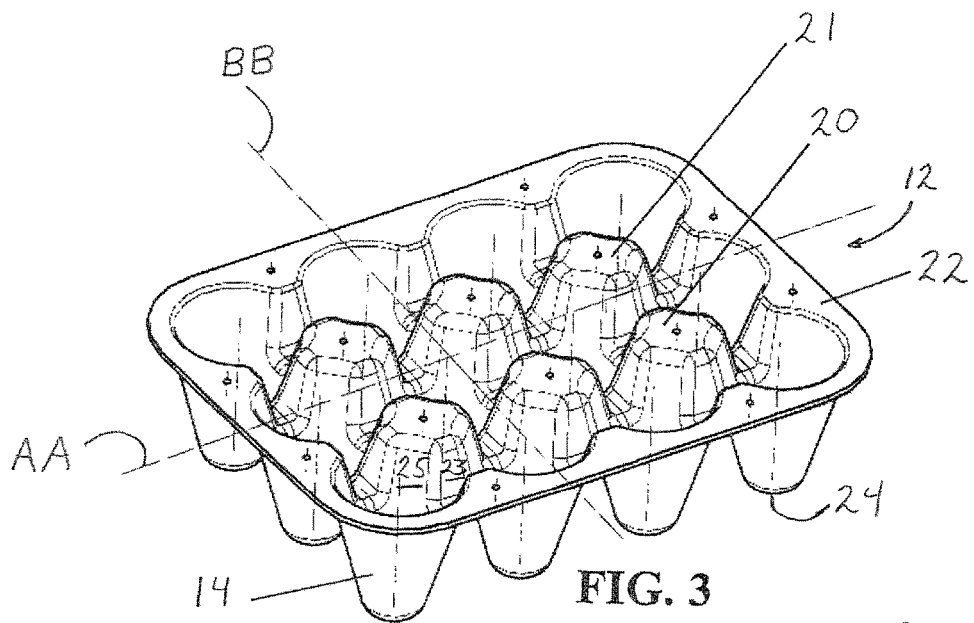
FIG. 3 is a quartering perspective view of the top of the energy absorbing system depicted in FIG. 2.
Figure 4:
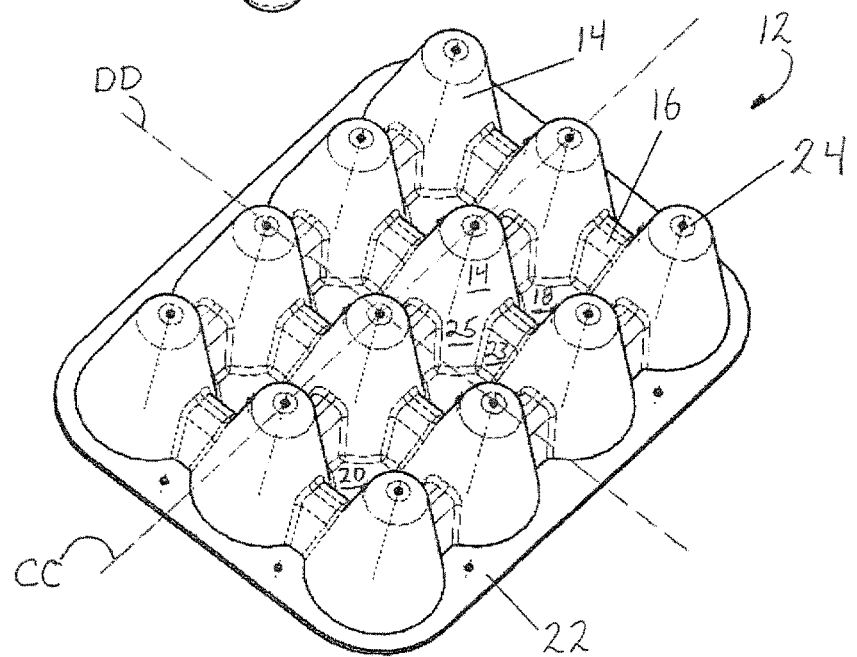
FIG. 4 is a quartering perspective view of the underside of the energy absorbing system depicted in FIG. 2.

As best shown in FIGS. 2-4, at least some of the modules 12 have an array of preferably generally frustoconical structures 14. Adjacent frustoconical structures 14 are joined by hollow interconnecting ribs 16 (FIG. 4). In this context, "adjacent" refers to frustoconical structures 14 that are aligned in parallel with either the CC or DD axes. Nestled between the frustoconical structures 14 are support pillars 20 (FIG. 2), the tops of which optionally underlie an occupant-supporting surface 50. In FIGS. 2-4, a set of six support pillars 20 is shown, but the disclosed seat impact energy absorbing system 10 is not so limited. It will be appreciated, for example, that the seat impact energy absorbing system shown in FIGS. 2-4 includes twelve frustoconical structures 14 and six support pillars 20. But the invention is not so limited. Other combinations of structures 14 and pillars 20 are considered to be within the scope of this disclosure.

In one method of manufacturing, a base in planar or sheet form 22 enters a thermoforming machine and is heated. Conventionally, thermoforming is a manufacturing process in which a plastic sheet is heated to a pliable forming temperature, formed to a specific shape in a mold, and trimmed to create a usable product. See, e.g. https://en.wikipedia.org/wiki/Thermoforming. Interaction between a male and a female mold forms the frustoconical structures 14 and ribs 16 below a basal plane defined by the axes AA-BB (FIG. 3). In so doing, support pillars 20 are formed with in one example with contiguous walls 23, 25 which are shared with associated ribs 16 and the frustoconical structures 14 (FIG. 4).

The support pillars 20 have tops 21 that lie in the basal plane defined by the axes AA-BB (FIG. 3). In one case (FIG. 4), one centrally located frustoconical structure 14 is united with four ribs 16. The corner structures 14 have two ribs 16 emerging therefrom. Other structures 14 that lie along an edge of the base 22 have three ribs 16 emerging therefrom. In one embodiment (FIGS. 2-3), a given support pillar 20 has eight faceted walls that are joined by rounded edges to minimize stress concentration.

As used herein, the term "frustoconical" generally describes a cone with the tip removed. The cone may be a "right" cone with an axis that is perpendicular to its base, or oblique if otherwise. The term also includes a frustoprismatoid and a structure which is curvilinear and hollow. The term "curvilinear" conveys that when viewed from a side, a frustoconical structure may have linear sidewalls. But when viewed from above or below, the open ends of the frustoconical structures appear to be curved, circular, oval, elliptical, or polygonal.

The underside of each support pillar 20 can be viewed as a recess 18 (FIG. 4). Each recess 18 is defined by the ribs 16 that connect the frustoconical structures 14 and walls of those structures 14. Thus, a given frustoconical structure 14 and support pillar 20 for ease of manufacturing and structural integrity in response to a hit share a common wall.

The support pillars 20 are formed from a base 22. In a preferred embodiment, the feet 24 of frustoconical structures 14 interact with one or more impact-receiving surfaces 26, such as plates. Preferably, for stability, the feet 24 lie in a plane defined by the axes CC-DD (FIG. 4).

The seat impact energy absorbing system 10 may include a number (n) of modules 12 (where 1<n<1,000,000), depending on the footprint on the impact-receiving surface 26 over which the system is installed.

If desired, the impact energy absorbing system 10 can be installed on a vehicle floor or in a rear compartment thereof or in a side wall of the vehicle. As used herein, the term "vehicle" includes heavy machinery used in construction or industry, helicopters and aircraft.

An alternate embodiment includes an occupant-supporting surface 50 which rests upon or attaches to the tops 21 of the support pillars 20 in the basal plane defined by the axes AA-BB. Optionally, this surface 50 is affixed to a perimeter of the base 22 of energy absorbing module 12 and/or to the tops 21 of support pillars 20 and/or a seat frame or seat cover using attachment means 34 such as rivets, nuts and bolts, a weld, or glue. In some embodiments, the impact-receiving surface 26 may serve as a lateral stabilizer when affixed to a frustoconical structure 14.

One purpose of the occupant-supporting surface 50 is to provide a firm feel below the seat occupant and distribute loads over multiple support pillars 20 and frustoconical structures 14. These occupant-supporting surfaces 50 may or may not be added to the energy absorbing modules 12 depending upon customer requirements. Optionally, means for attachment (such as rivets, nuts and bolts, a weld, or glue) are provided.

Once a complete seat impact energy absorbing system 12 has been installed, the system 12 may be covered with layers of cushioning or thermally insulating or flame retardant materials. If desired, the occupant-supporting surfaces 50 may themselves be cushioned or be covered by a cushioning material.

It will be appreciated that the occupant-supporting surface 50 can be laid across or secured to one or more modules 12.

Optionally, the impact-receiving surface 26 may be dispensed with when the frustoconical structures 14 are shorter than about 2 inches. In that case, an affixed plate 26 that serves at least in part as a lateral stabilizer may not be needed.

As mentioned earlier, one method by which to manufacture the energy absorbing module 12 is thermoforming.

Another is by injection molding or vacuum forming. Thermoforming approaches enable easy performance tuning by changing sheet thickness and material type that is thermoformed over the tool. It will be appreciated that thermoforming lends itself to rapid high volume manufacturing and low manufacturing costs. Ideally, a resilient thermoplastic, such as resilient thermoplastic polyurethane, offers an optimal balance of cost and performance. In some applications, the material of choice for the energy absorbing system 10 is a thermoplastic urethane. Additional materials may be compounded into the thermoplastic, such as flame retardant packages, to meet customer codes or performance criteria.

If desired multiple energy absorbing modules 12 may cooperate by being joined together by such means as push-pin fasteners, rivets, bolts, screws, weldments and adhesives.

FIGS. 2-3 illustrate embodiments in which the tops 21 of the support pillars 20 are uppermost. If desired, the energy absorbing module 12 could be inverted. In that configuration, the foot 24 of a frustoconical structure lies uppermost, preferably below an occupant supporting surface 50. That surface 50 may be embodied by a blast-resistant plate or cushion.

Figure 5:
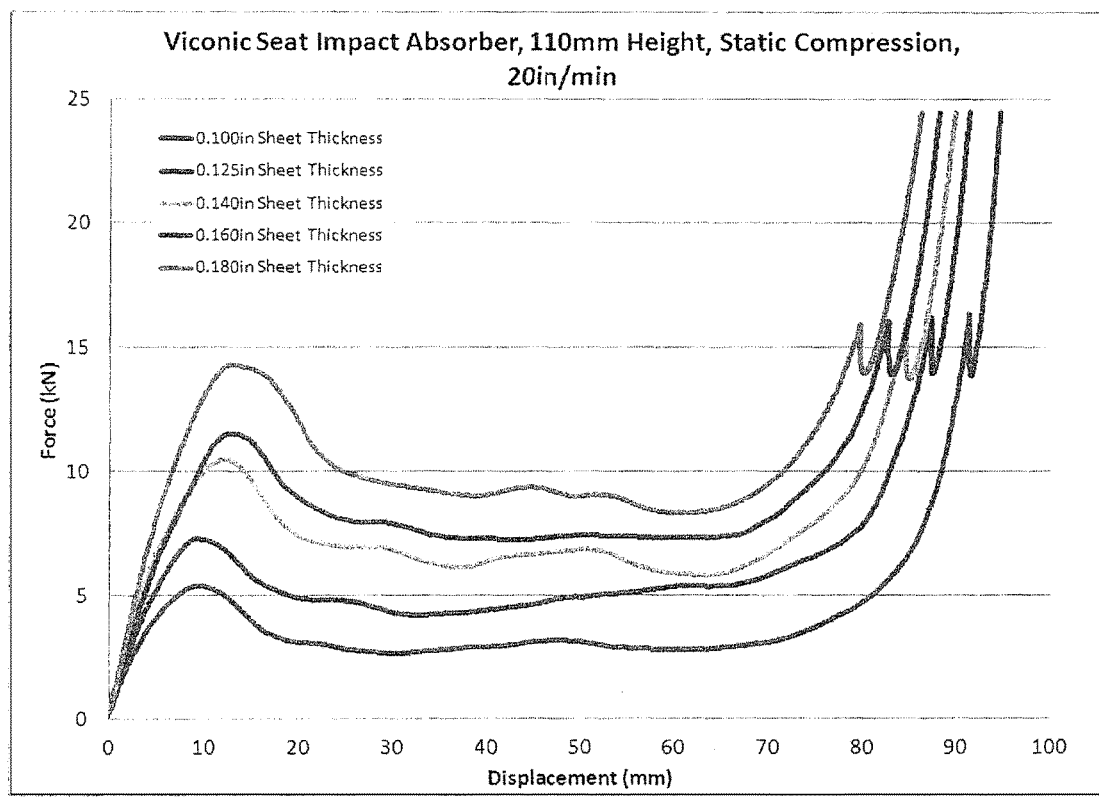
FIG. 5 is a set of force displacement curves for representative seat impact energy absorbers.

FIG. 5 is a force displacement graph that compares response characteristics of seat impact absorbers of various thicknesses.

The dynamic Response Index (DRI) is a measure of the likelihood of spinal damage arising from a vertical shock load such as might be encountered in a military environment (i.e., during a mine blast, or in an ejection seat). The DRI is a dimensionless number which is proportional to the maximum spinal compression suffered during the event—https://en.wikipedia.org/wiki/dynamic_response_index.

The table below compares the r Hybrid III $50^{th}$ percentile male dummy response to a 7 m/s simulated blast event. The DRIz, peak lumbar force and peak pelvis accelerations are reduced by using the disclosed seat absorber, thereby reducing the risk of injury to the seat occupant.

| Absorber | Pelvis (seat) vertical (DRIz) | Lumbar Force in Z (N) | Pelvis vertical acceleration (G) |
|---|---|---|---|
| Conventional absorber | 23.5 | 7,897 | 63.5 |
| Disclosed Absorber | 23.3 | 7,702 | 48.7 |

For ease of reference, here is a list of numerals and features:

| Reference Numeral | Feature Name |
|---|---|
| 10 | Seat impact energy absorbing system |
| 12 | Energy absorbing module |
| 14 | Frustoconical structure |
| 16 | Ribs |
| 18 | Recess |
| 20 | Support pillar |
| 21 | Top of 20 |
| 22 | Base |
| 24 | Foot of 14 |
| 26 | Impact receiving surface |
| 34 | Attachment means |
| 50 | Occupant-supporting surface |

As required, detailed embodiments of the present invention are disclosed herein; however, it is to be understood that the disclosed embodiments are merely exemplary of the invention that may be embodied in various and alternative forms. The drawing figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat impact energy absorbing system comprising:
    an impact-receiving surface that is exposed to a blast event;
    an energy absorbing module positioned above the impact-receiving surface that manages forces generated by the blast event,
    the energy absorbing module having
        a base below which a plurality of frustoconical structures extend, the frustoconical structures having feet that interact with the impact-receiving surface, the frustoconical structures being joined by hollow interconnecting ribs that create there between one or more support pillars wherein at least some of the one or more support pillars share a common wall with an associated frustoconical structure and rib; and
        an occupant-supporting surface that is positioned above the energy absorbing module, at least some of the support pillars having tops that underlie the occupant-supporting surface.

2. The seat impact energy absorbing system of claim 1 wherein at least some of the one or more support pillars have tops that are co-planar.

3. The seat impact energy absorbing system of claim 1, wherein at least some of the one or more support pillars have faceted sidewalls that are formed by adjacent frustoconical structures and ribs.

4. The seat impact energy absorbing system of claim 1, including one or more energy absorbing modules wherein adjacent energy absorbing modules coordinate and connect to one another through means for attaching selected from the group consisting of pushpin fasteners, rivets, bolts, screws, weldments and adhesives.

5. The seat impact energy absorbing system of claim 4, wherein a number (n) of energy absorbing modules is such that $1<n<1,000,000$.

6. The seat impact energy absorbing system of claim 1, wherein the occupant-supporting surface is attached to at least some of the tops of the support pillars and/or the base.

7. The seat impact energy absorbing system of claim 1, wherein the frustoconical structures have feet and the impact receiving surface is attached to at least some of the feet of the frustoconical structures.

8. A method of manufacturing the seat impact energy absorbing system of claim 1 comprising a thermoforming step.

9. The method of claim 8 wherein the thermoforming step includes the step of using a thermoplastic material.

10. The method of claim 9, further including the step of compounding additional materials into the thermoplastic material, such as a flame retardant.

* * * * *